(12) United States Patent
Jöckel

(10) Patent No.: US 11,891,981 B2
(45) Date of Patent: Feb. 6, 2024

(54) GENERATOR/GEARBOX ARRANGEMENT FOR A WIND POWER INSTALLATION WITH A BRAKE

(71) Applicant: Flender GmbH, Bocholt (DE)

(72) Inventor: Andreas Jöckel, Nuremberg (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/036,317

(22) PCT Filed: Nov. 26, 2021

(86) PCT No.: PCT/EP2021/083149
§ 371 (c)(1),
(2) Date: May 10, 2023

(87) PCT Pub. No.: WO2022/117452
PCT Pub. Date: Jun. 9, 2022

(65) Prior Publication Data
US 2023/0392579 A1    Dec. 7, 2023

(30) Foreign Application Priority Data
Dec. 2, 2020 (EP) .................................. 20211250

(51) Int. Cl.
*F03D 7/02* (2006.01)
*F03D 15/10* (2016.01)
(Continued)

(52) U.S. Cl.
CPC ........... *F03D 7/0248* (2013.01); *F03D 15/10* (2016.05); *H02K 7/116* (2013.01); *H02K 7/1838* (2013.01);
(Continued)

(58) Field of Classification Search
CPC ....... F03D 7/0248; F03D 15/10; H02K 7/116; H02K 7/1838; H02K 49/046; F05B 2260/903
See application file for complete search history.

(56) References Cited

U.S. PATENT DOCUMENTS 519,674 A * 5/1894 Heilmann ............ B61D 43/00
                                                   105/1.1
895,618 A * 8/1908 Clark ........................ H02P 9/00
                                                   290/12
(Continued)

FOREIGN PATENT DOCUMENTS

DE   10 2018 100 951   7/2019
FR   3 016 252         7/2015

OTHER PUBLICATIONS

International Search Report issued by the European Patent Office in International Application PCT/EP2021/083149 dated Feb. 14, 2022.

*Primary Examiner* — Tulsidas C Patel
*Assistant Examiner* — Thomas K Quigley
(74) *Attorney, Agent, or Firm* — Henry M. Feiereisen LLC

(57) ABSTRACT

A generator-gearbox arrangement for a wind turbine includes a generator having a stator and a rotor interacting with one another, a functional component arranged on an end side of the generator and including an extension which points toward the rotor, and a magnetic rail brake arrangement including component parts fastened to the extension. The magnetic rail brake arrangement is designed to apply a braking action which is based on an operating principle of electromagnetic attraction between the magnetic rail brake arrangement and at least one of the rotor and the functional component.

13 Claims, 3 Drawing Sheets

(51) Int. Cl.
*H02K 49/04* (2006.01)
*H02K 7/18* (2006.01)
*H02K 7/116* (2006.01)

(52) U.S. Cl.
CPC .... *H02K 49/046* (2013.01); *F05B 2260/4031* (2013.01); *F05B 2260/903* (2013.01)

(56) References Cited

U.S. PATENT DOCUMENTS

| | | | | |
|---|---|---|---|---|
| 3,723,795 | A | * | 3/1973 | Baermann ............ H02K 49/046 188/41 |
| 4,738,148 | A | * | 4/1988 | Norton .................. F02N 15/066 290/38 R |
| 8,376,708 | B2 | | 2/2013 | Patel et al. |
| 2009/0162202 | A1 | * | 6/2009 | Nies ...................... F03D 7/0264 416/169 R |
| 2014/0110947 | A1 | * | 4/2014 | Mongeau ............... H02K 7/104 290/55 |
| 2018/0195593 | A1 | * | 7/2018 | Harper ................... F16H 3/721 |

* cited by examiner

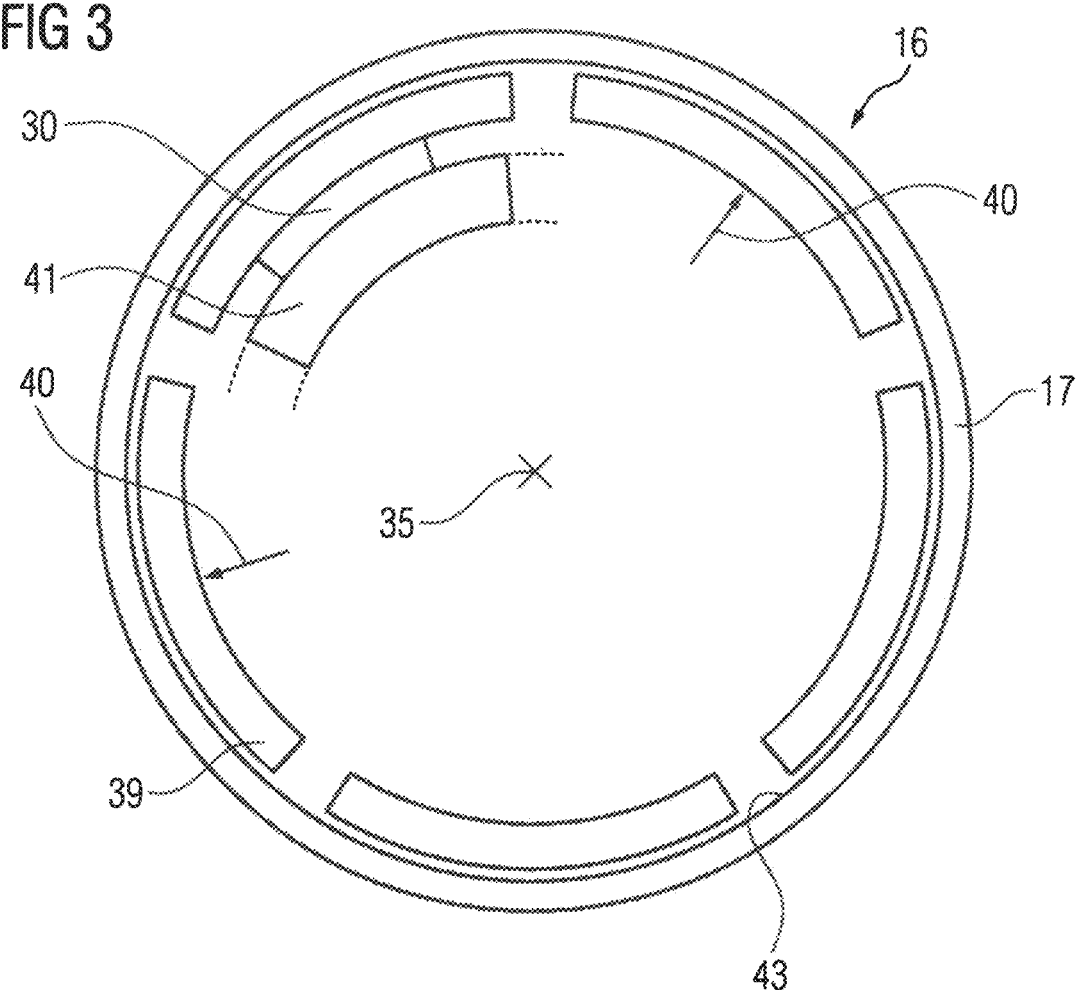

GENERATOR/GEARBOX ARRANGEMENT FOR A WIND POWER INSTALLATION WITH A BRAKE

CROSS-REFERENCES TO RELATED APPLICATIONS

This application is the U.S. National Stage of International Application No. PCT/EP2021/083149, filed Nov. 26, 2021, which designated the United States and has been published as International Publication No. WO 2022/117452 A1 and which claims the priority of European Patent Application, Serial No. 20211250.4, flied Dec. 2, 2020, pursuant to 35 U.S.C. 119(a)-(d).

BACKGROUND OF THE INVENTION

The invention relates to a generator-gearbox arrangement, to a wind turbine comprising a generator-gearbox arrangement and to the use of a magnetic rail brake arrangement. U.S. Pat. No. 8,376,708 B2 discloses a wind turbine comprising a drive train with gearbox and generator. This drive train comprises, inter alia, a mechanical brake system which is arranged on the side facing away from the generator.

FR 3 016 252 A1 discloses a wind turbine comprising a drive train with gearbox and generator, in which a disk brake is fastened to a stator housing of the generator and is able to mechanically brake a disk, protruding from a rotor of the generator, with the aid of axially displaceable friction disks.

Such arrangements take up a relatively large axial installation space.

Proceeding therefrom, the invention is based on the object of providing a compact, high-performance generator-gearbox arrangement, in particular of a wind turbine. In this case, the intention is in particular to reduce the axial structural length of the generator-gearbox arrangement and make it compact. The drive train of the wind turbine is also intended to have a relatively high efficiency.

SUMMARY OF THE INVENTION

The solution to the problem according to the invention is achieved by a generator-gearbox arrangement as set forth hereinafter, a wind turbine as set forth hereinafter, and the use as set forth hereinafter. Preferred configurations are specified in the dependent claims and the following description, which may in each case Individually or in combination represent an aspect of the invention. If a feature is presented in combination with another feature, this serves only for simplified presentation of the invention and is in no way intended to mean that this feature cannot also be a development of the Invention without the other feature.

The invention relates to a generator-gearbox arrangement for a wind turbine with a functional component
  wherein the generator comprises a stator and a rotor,
  wherein the functional component is arranged on an end side of the generator,
  wherein the functional component, in particular a radially central portion of the functional component, comprises at least one extension which points toward the rotor, in particular Into an interior space of the rotor,
  wherein at least component parts of at least one magnetic rail brake arrangement are fastened to the extension,
  wherein a braking action of the magnetic rail brake arrangement is based on an operating principle of electromagnetic attraction between the magnetic rail brake arrangement and the rotor and/or the functional component (9). In particular, the generator-gearbox arrangement is part of a wind turbine.

The solution to the problem according to the invention Is also achieved by means of a wind turbine comprising a generator-gearbox arrangement according to the invention, wherein an actuating means of a magnetic rail brake arrangement is embedded in a control structure of the wind turbine.

The arrangement according to the invention of the magnetic rail brake arrangement of a generator-gearbox unit, in particular of a wind turbine, at least partially in the interior space of a rotor of the generator makes it possible for the drive train of the wind turbine to be of axially shortened embodiment. This makes it possible for a nacelle of the wind turbine to be of shorter embodiment or for the installation space which is now gained by comparison to be utilized in some other way.

The generator provided in this case Is a rotary dynamo-electric machine, preferably an asynchronous machine or synchronous machine. The gearbox provided in this case is preferably a two-stage or three-stage planetary gearbox.

The functional component is stationary, that is to say that it does not move together with the rotor or component parts of the gearbox during operation of the wind turbine.

The functional component, in particular the radially outer region, comprises extensions for the gearbox and the generator.

The radially central portion of the functional component comprises one or more extensions which are suitable for receiving or for fastening at least parts of a magnetic rail brake arrangement.

The radially inner region of the functional component has receiving possibilities, for example a connection piece as a seat for a bearing.

The functional component may be only a cover, a bearing shield with and without connection piece for receiving a bearing. The functional component may equally comprise bearing component parts and/or cooling component parts, as well as flange extensions of gearbox and/or generator in the radially outer region of the functional component.

The functional component thus comprises a generator flange extension and a gearbox flange extension. These flange extensions are suitable for receiving at least parts of the generator and/or parts of the gearbox or the housing thereof.

The generator flange extension and the gearbox flange extension are oriented in axially different directions.

The functional component is preferably of one-piece embodiment. As a result, screwed transition points in the flow of force and torque may also be avoided between the individual component parts mentioned above, such as, inter alia, generator flange extension and gearbox flange extension.

To this end, the functional component is embodied as a cast part or produced from solid material by cutting.

In a further embodiment, at least parts or portions of the functional component are machined, that is to say milled, ground, etc. It Is also possible for at least some component parts, such as generator flange extension, gearbox flange extension, connection piece and/or other extensions, to be added at least in part in a materially bonded manner by means of additive manufacturing.

This also permits the creation of shaped portions/ribs/cutouts, which are used to reinforce the functional component or to create cooling ducts or lubricating ducts within the functional component or at least one of its component parts.

It is equally also possible for the above-mentioned component parts of the functional component, such as extensions, connection piece, etc., to be welded on or fastened in a releasable manner for example by means of screw connection.

The braking action of the magnetic rail brake arrangement is based on an operating principle of electromagnetic attraction between the magnetic rail brake arrangement and the rotor and/or the functional component. The attractive forces of the electromagnetic attraction may be generated by the radial forces of electromagnetic poles, wherein, in particular, the electromagnetic poles are fed only by a connectable battery. In order to actuate the magnetic rail brake arrangement which is constructed in accordance with the principle of the magnetic rail brake, it suffices for merely a battery to be activated, in order to supply the electromagnetic poles with electrical energy, in particular direct current, and to, by way of the pronounced radial forces, achieve braking of the rotor on the functional component, which in particular stands firm in an immovable manner, by way of the electromagnetic poles. By way of example, at least one electromagnetic pole is provided on the at least one extension radially within a part of the rotor that can be attracted electromagnetically, said electromagnetic pole in the activated state generating an electromagnetic field which attempts to attract the rotor and thereby slow it down. Here, it is possible for the rotor to be slowed down in a purely electromagnetic and, as a result, virtually wear-free manner, and/or for a brake element, which is in particular fastened to the functional component in a rotationally fixed manner, to be electromagnetically attracted electromagnetically to the rotor in order to additionally or alternatively achieve mechanical braking of the rotor.

A magnetic rail brake arrangement according to the invention may comprise a grinding shoe with built-in electromagnets. When current is flowing through the electromagnet (open circuit principle), the grinding shoe is pulled or pushed against the rotor, in particular the inner side of the hollow cylinder. The axial portion of the hollow cylinder comprises brake surfaces, in particular brake surfaces shaped in a rail-like manner. Friction is produced between the moving brake surfaces and the grinding shoe or grinding shoes pressed against them, said friction converting the kinetic energy of the movement or rotation of the rotor into heat until the kinetic energy of the drive train of the wind turbine is "consumed" or the magnetic rail brake arrangement is deactivated. Furthermore, additional eddy current induction, in particular in a brake surface shaped in a rail-like manner, may occur, which generates a force acting counter to the rotation. Since the friction forces increase and the eddy-current forces decrease as rotational speed decreases, a virtually linear braking action of the magnetic rail brake arrangement can occur.

The for a grinding shoe friction force applied to the rotor by the magnetic rail brake arrangement is in this case based on the electromagnetic attraction of the grinding shoe to the rotor. The electromagnet built into the respective grinding shoe is in particular consolidated with the grinding shoe so as to be fixed against movement. As a result, the electromagnet does not act as an actuator for a displacement of the grinding shoe relative to the electromagnet, but rather the energized electromagnet acts as an electromagnetic pole which is electromagnetically attracted to the rotor and which in this case carries along the grinding shoe. In particular, by means of a normal force leading to a friction force, the grinding shoe can be electromagnetically compressed between the rotor and the electromagnet which is electromagnetically attracted to the rotor. As a result, the level of the friction force can easily be set by way of the electrical power supplied to the electromagnet. It is in particular possible to provide a friction force which varies temporally over the braking time, such that the rotor can be slowed down in a defined and optimal manner. By way of example, noises, in particular brake screeching or brake squealing, which are caused by natural oscillations during braking can be avoided by the supplied electrical power following a correspondingly predefined profile, which is preferably dependent on the current rotational speed of the rotor.

The rotor comprises a rotor support structure, on the radial outer circumference of which a laminated rotor core comprising permanent magnets, a squirrel cage rotor or a winding system is arranged. This laminated core is fixedly connected to, for example shrink-fitted onto, a hollow cylinder. The hollow cylinder is connected to a rotor hub by means of connecting elements, in particular a spoke structure. The spoke structure transmits drive torques, and also brake torques, from and to the gearbox output shaft. The spoke structure of the connecting elements reduces the weight of the rotor support structure. The hollow cylinder or at least axial portions of the hollow cylinder also have brake surfaces on the inner circumference thereof. A braking action is in this case achieved by the magnetic rail brake arrangement when the grinding shoe of the magnetic rail brake arrangement pushes against the brake surface.

The functional component, in particular the central part, comprises at least one extension. This extension, which projects into the generator space, is embodied so as to run circumferentially or is embodied as a plurality of extensions which run partially circumferentially and to which at least component parts of the magnetic rail brake arrangement are attached.

In the generator space, in the region of the functional component, a magnetic rail brake arrangement is now provided which can function as a holding brake or service brake of the wind turbine.

In the case of the magnetic rail brake arrangement, the counterpart of the grinding shoe is a part of the rotor support structure, in particular a correspondingly provided, turned-out hollow cylinder, or of a hollow cylinder provided with a radially Inwardly pointing rail. This hollow cylinder simultaneously serves as reinforcing element of the rotor support structure and thus of the rotor of the generator.

The electrical actuation energy of the magnetic rail brake arrangement is provided, for example, by a battery and is in particular guided via the functional component, for example the generator flange extension and/or the gearbox flange extension. The grinding shoe of the magnetic rail brake arrangement is actuated by way of example either by a superordinate control structure of the wind turbine or manually. This describes the open circuit principle.

In the case of the closed circuit principle, in which for example an electromagnet works against a spring in order to lift off the grinding shoe, a braking action is introduced in the event of failure of the auxiliary energy supply, for example due to a wire breakage. This is important as a "fail-safe" for safety-related emergency braking operations.

In particular, the magnetic rail brake arrangement does not comprise only one grinding shoe, rather a plurality of grinding shoes which can be actuated together or in alternating fashion are arranged on the extension or extensions of the radially central part. The grinding shoe and the complementary brake surfaces thereof may be arranged in an axially offset manner within the inner surface of the hollow cylinder. This can reduce the torsion action on account of the braking and distribute the brake abrasion among a plurality of brake arrangements.

By virtue of the fact that the rotor support structure is of spoke-like embodiment, maintenance work, for example exchange of brake component parts, can be carried out in a simple manner. This is effected, for example when the installation is shut down, by way of an axial access between the spokes of the rotor support structure.

The arrangement according to the invention of the magnetic rail brake arrangement on the functional components and the thus compact generator-gearbox unit according to the invention result in a reduction in the axial structural length.

Owing to the cantilevered mounting of the generator, it is possible to dispense with a bearing shield on the NDE side.

It is therefore also not necessary to have a cover for the rotating magnetic rail brake arrangement, since the latter is arranged within the interior space of the rotor, said interior space not being readily accessible.

Owing to the brake arrangement on the functional component, a short, direct flow of force/torque from the brake arrangement, in particular grinding shoe and brake surface, via the rotor to the gearbox is ensured. This may be assisted in particular by the integral form of the functional component, in that there are no screwed transition points in the flow of force or torque. In this way, the need for frictionally locking connections may also be omitted or at least minimized.

The generator-gearbox arrangement of a wind turbine with a common functional component of this generator-gearbox unit is then of extremely compact embodiment, in particular axially.

The cooling of at least this generator may be effected by air or a cooling liquid. In one embodiment, a stator of the generator is provided with oil cooling, while the rotor has air cooling. In this case, the stator is sealed off from the rotor by a can in the air gap of the dynamoelectric machine. Oil cooling is implemented by means of cutouts or ducts in the laminated core of the stator and/or in the generator flange extension.

In this case, the functional component therefore comprises cutouts or ducts and means for sealing the can, for example component parts of a labyrinth seal.

The gearbox is in particular a two-stage or three-stage planetary gearbox which extends on that side of the functional component which faces away from the generator side. Oil cooling may also be provided there, for which cutouts or ducts are provided in the gearbox flange extension.

The radially central part of the functional component connects the generator flange extension and the gearbox flange extension. Furthermore, this central part establishes a mechanical connection to a connection piece, which is suitable as a bearing seat, in order to mount a gearbox output shaft which Is connected to the rotor in a rotationally fixed and torque-transmitting manner.

Bearings provided in this case are, for example, a double-row bearing in an X arrangement or tapered-roller bearing, etc.

In order to ensure lubrication of the bearing arrangement, lubricating ducts are provided in the functional component, in particular in the central part and/or in the connection piece.

The gearbox output shaft is mechanically connected, for example by way of a releasable clamping apparatus or an electrically insulating flange connection, to a rotor hub of the rotor support structure in a torque-transmitting manner.

This simple compact construction also results in simple assembly or a simple Interface for a turner gear which is required for assembling rotor blades of the wind turbine.

Due to the multiple use of components (for example brake surface or brake rail as reinforcing element, functional component inter alia as common cast housing with flange for generator and gearbox, which serves as non-positive connection for brake forces and torques, etc.), a compact generator-gearbox unit of a wind turbine is provided.

A wind turbine comprising such a generator-gearbox unit according to the invention leads to an extremely compact and high-performance wind turbine owing to the multiple use of the components or component parts.

As a result of oil cooling of generator and/or gearbox and air cooling at least of the rotor, a wind turbine with relatively high efficiency Is provided.

The invention also relates to the use of a magnetic rail brake arrangement, which is in particular fed with direct current from a battery, for braking a rotor of a generator-gearbox arrangement for a wind turbine, which may in particular be formed and developed as described above, wherein a braking action of the magnetic rail brake arrangement is based on an operating principle of electromagnetic attraction between the magnetic rail brake arrangement and the rotor.

BRIEF DESCRIPTION OF THE DRAWING

The invention and further configurations of the invention are schematically illustrated in the following exemplary embodiments; in the figures:

FIG. 3 shows a schematic cross section of the magnetic rail brake arrangement.

DETAILED DESCRIPTION OF PREFERRED EMBODIMENTS

It should be noted that terms such as "axially", "radially", "tangentially", etc., refer to the axis used in the respective figure or in the respectively described example. In other words, the directions axially, radially and tangentially always refer to an axis of rotation of the rotor and thus to the corresponding axis of symmetry of the stator. In this case, "axially" describes a direction parallel to the axis, "radially" describes a direction orthogonal to the axis, toward said axis or away therefrom, and "tangentially" is a direction which is directed at a constant radial distance from the axis 35 and, in the case of a constant axial position, circularly about the axis 35. The expression "in the circumferential direction" can essentially be equated with "tangentially".

With regard to an area, for example a cross-sectional area, the terms "axially", "radially", "tangentially", etc., describe the orientation of the normal vector of the area, that is to say the vector which is perpendicular to the area in question.

The term "adjacent", in conjunction with components, for example with coils or stator teeth, is intended to express the fact that, in the case of "adjacent components", there is in particular no further such component between these two components, and Instead there is at most an empty intermediate space or possibly a component of a different type.

The expression "coaxial components", for example coaxial component parts such as rotor and stator, is understood here to mean components which have Identical normal vectors, for which the planes defined by the coaxial components are thus parallel to one another. Furthermore, the expression is intended to encompass the fact that the center points of coaxial components lie on the same axis of rotation or axis of symmetry. However, these center points may possibly lie at different axial positions on this axis, and the planes mentioned are thus at a distance >0 from one another. The expression does not necessarily require coaxial components to have the same radius.

The term "complementary", in the context of two components which are "complementary" to one another, means that their outer shapes are designed in such a way that the one component can preferably be arranged completely in the component which is complementary thereto, such that the inner surface of the one component and the outer surface of the other component ideally come into contact in a gapless or full-area manner. Consequently, in the case of two articles which are complementary to one another, the outer shape of the one article is thus defined by the outer shape of the other article.

For the sake of clarity, sometimes, in the cases in which components are present multiple times, frequently not all of the illustrated components are provided with reference signs in the figures.

Figure 1:
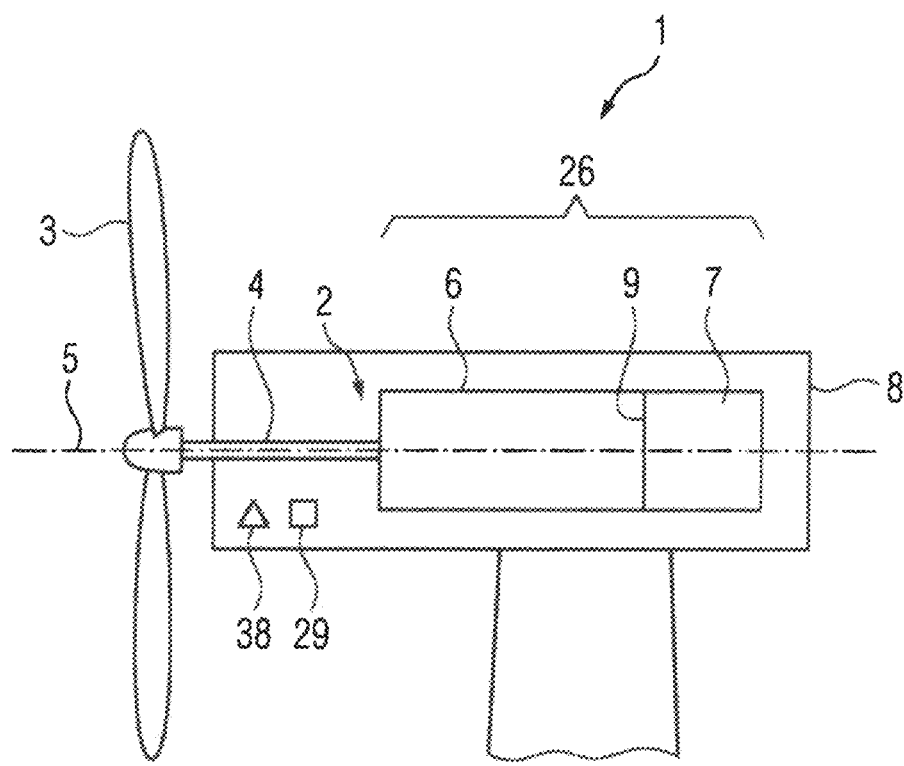
FIG. 1 shows a schematically Illustrated wind turbine.

FIG. 1 shows the upper part of a wind turbine 1, which may be situated onshore or offshore. In the energy generation mode of the wind turbine 1, the wind rotor shaft 4 is set in rotation about the wind rotor axis 5 by way of a wind rotor 3. In this case, a generator 7 is driven by way of a gearbox 6. The generator 7 is electrically coupled to a superordinate electrical grid by way of an inverter (not illustrated in any more detail). A drive train 2 is thus composed of the wind rotor 3, the wind rotor shaft 4, the gearbox 6 and the generator 7.

The generator 7 and the gearbox 6 are arranged in a nacelle 8 of the wind turbine 1. Also arranged in the nacelle 8 are, inter alia, inverters of the generator 7 and monitoring and control systems of the wind turbine 1. Furthermore, at least component parts, for example heat exchangers of a wide variety of cooling systems of the wind turbine component parts, such as generator 7, gearbox 6, etc., are provided in the nacelle 8.

Furthermore, torque supports (not illustrated in any more detail) of the generator-gearbox arrangement 26, which receive drive and brake torques, are present in the nacelle 8.

Gearbox 6 and generator 7 may also be separated from one another by a shaft portion. In this case, the generator 7 then receives a functional component 9 and the gearbox 6 merely an end-side termination. In order to nevertheless achieve axial compactness, it is, inter alia, essential that a magnetic rail brake arrangement 14 be at least partially arranged radially within the generator 7 or within a rotor 15 of the generator 7. This is made possible by a functional component 9 having one or more axially extending extensions 41 in the direction of the rotor 15, said extensions being discussed in more detail at a later stage.

Figure 2:
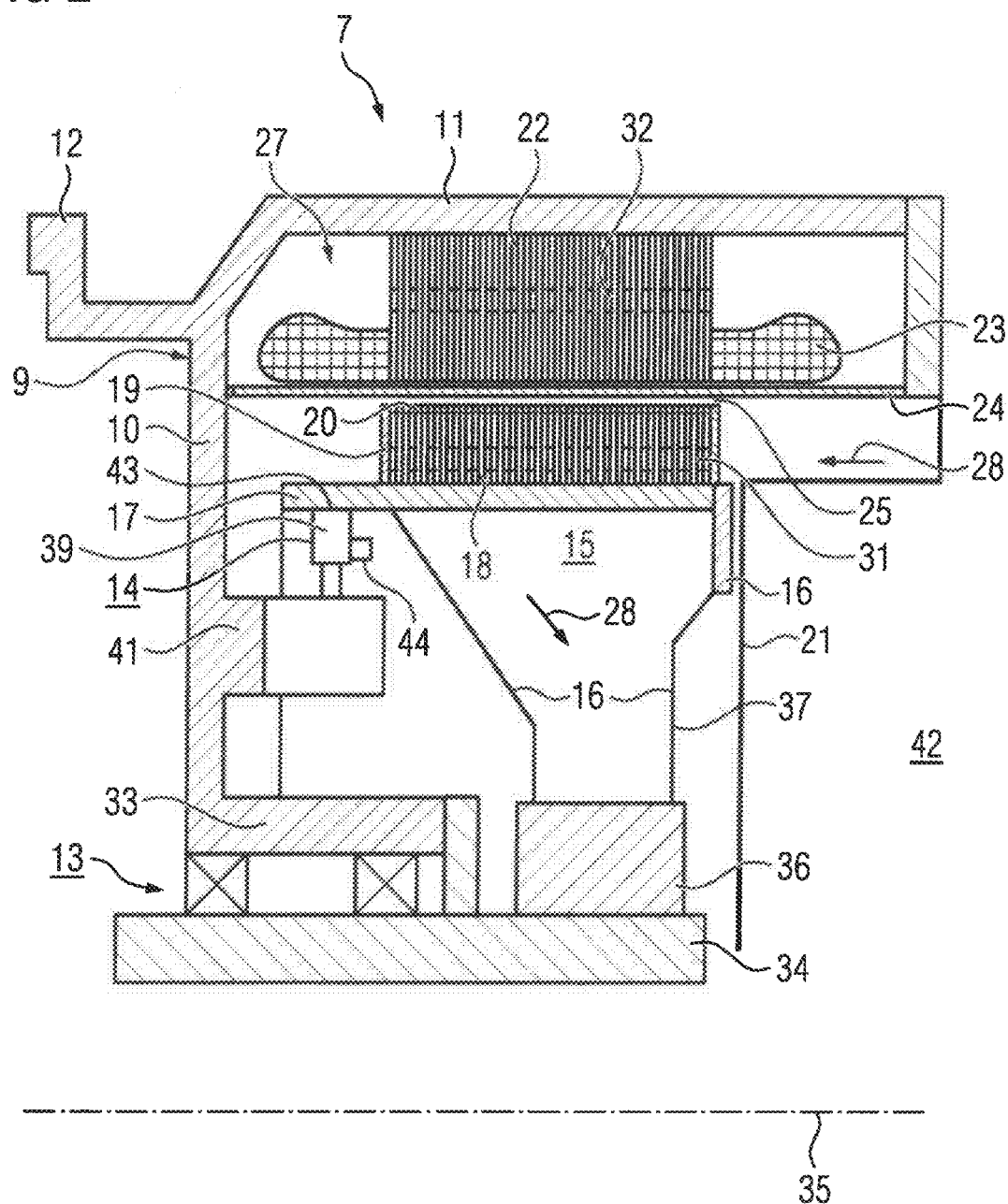
FIG. 2 shows a functional part, with a generator.

FIG. 2 shows, in a schematic partial longitudinal section of the generator 7 with its generator flange extension 11, the functional component 9 and a gearbox flange extension 12.

The gearbox flange extension 12 receives at least component parts of a gearbox 6, in particular of a two-stage or three-stage planetary gearbox, such as a positionally fixed ring gear.

A gearbox output shaft 34 projects axially from the gearbox 6. Said gearbox output shaft rotates about an axis 35 which either runs in axial alignment with the wind rotor axis 5 or is oriented axially parallel thereto, that is to say is arranged coaxially.

The gearbox output shaft 34—here of hollow embodiment—is connected to the rotor 15 of the generator 7 in a rotationally fixed and torque-transmitting manner by way of a rotor hub 36.

The gearbox output shaft 34 is mounted in a bearing arrangement 13 which is positioned in a connection piece 33 of the functional component 9. Lubricant ducts (not illustrated in any more detail) for the bearing arrangement 13 may be provided within the connection piece 33 and/or the functional component 9.

The torque in the energy generation mode, and also a brake torque, is transmitted by way of the shaft-hub connection between the gearbox output shaft 34 and the rotor hub 36.

The shaft-hub connection can, in principle, be embodied as positively locking or non-positive connections. Owing to the upcoming stresses, such as large and/or alternating stresses, clamping sets or Interference fits are preferably used.

The rotor 15 comprises a rotor support structure 16 which contains the rotor hub 36, a hollow cylinder 17 and reinforcing elements or connecting elements, such as spokes 37. The hollow cylinder 17 comprising at least one brake surface 43 additionally has a reinforcing action on the rotor support structure 16.

The brake surface 43 of the hollow cylinder 17 may be designated as the surface within the hollow cylinder 17. Equally, it is possible for a radially inwardly pointing rail arrangement to be provided as brake surface 43 on the inner side of the hollow cylinder 17.

The functional component 9 on the side facing the gearbox 6 may also be in the form of a bearing shield of the generator 7.

At least some component parts of the magnetic rail brake arrangement 14 are arranged in the interior space of the rotor 15, although not necessarily radially within the laminated core 18 of the rotor 15.

The magnetic rail brake arrangement 14 is preferably arranged on a side of the rotor 15, in particular the side facing the functional component 9. In this illustration, the brake surface 43 is formed in particular in an axial prolongation of the hollow cylinder 17 in the direction of the functional component 9, axially outside the laminated core 18 of the rotor 15. A more axially central arrangement of the brake surface 43 within the hollow cylinder 17, that is to say radially "below" the laminated core 18 of the rotor 15, may reduce the torsion action on the rotor support structure 16 during braking.

Preferably, the rotor support structure 16, viewed spatially, is of shell-like embodiment, in order to provide Installation space for a connection piece 33, a bearing arrangement 13 and/or a brake arrangement 14. In this case, the opening of the "shell" points toward the functional component 9.

Arranged circumferentially on the rotor support structure 16 is the laminated core 18 of the rotor 15, said laminated core being assembled by pressure disks 19. The laminated rotor core 18 comprises permanent magnets 20 which are located in substantially axially running cutouts. These permanent magnets 20 may also be arranged on the surface of the laminated core 18.

Equally, considering efficient magnetic flux guidance, it is also possible for the permanent magnets 20 to be arranged in a V-shaped manner in the laminated core 18.

In this embodiment, that part of the hollow cylinder 17 which faces the functional component 9 is at least partially embodied as brake surface 43.

The grinding shoes 39 are positioned on an extension 41 of the functional component 9. Depending on the embodiment of the rotor support structure 16, the extension 41 is preferably provided in the form of a ring on the radially central part of the functional component 9. Provision may also be made there of a plurality of extensions 41 running on the same radius, as is also indicated in dashed form by way of example in FIG. 3. In this way, it is possible for one or more magnetic rail brake arrangements 14 to be arranged in this region. This can serve for increasing the brake force and/or for the redundancy of the magnetic rail brake arrangement 14.

The magnetic rail brake arrangements 14 are Incorporated into the superordinate control concept of the wind turbine 1. In this way, the magnetic rail brake arrangements 14 or, if a plurality of grinding shoes 39 are present, at least some of the grinding shoes 39 can perform holding functions, and also carry out service braking operations or emergency braking operations which lead to the generator 7 and thus ultimately the wind turbine 1 being at a standstill.

It is then possible to implement air cooling 28 in a simple manner via the NDE side 42 of the rotor 15. In this case, by way of example air is drawn in the outer region of the rotor 15 and guided through the cooling ducts 31 axially through the laminated core 18 and/or the air gap 25 to that side of the rotor 15 which faces the functional component 9. The heated air is then discharged axially from the rotor 15 again on the NDE side 42 via the magnetic rail brake arrangement 14 and the spoke Intermediate space 38. The air outlet is thus radially further toward the inside than the air inlet.

The air flow could alternatively be reversed. However, this would have the disadvantage that the abraded brake material of the magnetic rail brake arrangement 14 passes into the region of the air gap 25.

The air flow of the air cooling 28 is generated either by an external fan and/or by corresponding design of the spokes 37. In order to implement air cooling 28 of the rotor 15, the spokes 37 are designed in such a way that either a suction effect or pressure effect is generated during rotation of the rotor 15.

The stator 22 of the generator 7 comprises a laminated core, in which a winding system 30 forming winding heads 23 on the end-sides of the stator 22 is arranged. The stator 22 is sealed off at least on the side of the air gap 25 by a can 24. Liquid cooling of the stator 22, in particular oil cooling 27, is thus possible. On the side facing the functional component 9, the functional component 9 comprises means for positioning and/or of a can seal 26. Cooling ducts 32 of the stator 22 and/or distribution ducts are provided in or on the laminated core of the stator 22 and/or the slots of the stator 22 in the region of a winding system and/or on that side of the generator flange extension 11 which faces the stator 22. These ducts may also run within the generator flange extension 11.

The magnetic rail brake arrangement 14 is incorporated into the superordinate control concept of the wind turbine 1. In this way, the brake arrangements 14 can carry out holding functions and service braking operations, but also emergency braking operations. In the case of a plurality of magnetic rail brake arrangements 14 acting independently of one another, this can serve for increasing the brake force and/or for the redundancy of the magnetic rail brake arrangement 14.

Additional sensors 44 in or on the magnetic rail brake arrangement 14 are connected to the superordinate control device 29 and can monitor both the brake force, and wear, and the number of breaking operations, etc.

The electrical actuation energy of the magnetic rail brake arrangement 14 is provided, for example, by a battery 38 which is arranged in the nacelle 8, in particular in the vicinity of the generator-gearbox unit 26.

The described construction of the generator-gearbox unit according to the invention with the functional component 9 according to the Invention fundamentally ensures a compact embodiment, in particular in the axial direction. The generator 7 is mounted in a cantilevered manner, with the result that it is possible to not provide a bearing shield on the NDE side 42. Provision may merely be made of a cover 21 which comprises corresponding air outlet openings and air Inlet openings. This cover 21 is preferably composed of GRP.

The actuation energy of the respective magnetic rail brake arrangements 14 is provided, for example, by a battery 38 which Is advantageously arranged in the vicinity of the functional component 9, for example the generator flange extension 11 and/or the gearbox flange extension 12. This magnetic rail brake arrangement 14 is controlled and activated or deactivated either by a superordinate control structure 29 or manually.

FIG. 3 shows a schematic partial cross section of the magnetic rail brake arrangement 14. In this case, the brake surface 43 is Illustrated on the inner side of the hollow cylinder 17. The brake surfaces 43 may also be embodied as rails which point radially inward from the inner side of the hollow cylinder 17. Grinding shoes 39, which in the illustrated case are still spaced apart from the brake surface 43, push outward in the direction 40 when actuated and thus generate, by friction on the brake surface 43, the sought braking action of the rotor 15, and thus of the gearbox 6 and ultimately of the wind turbine 1.

Grinding shoes 39 and brake surfaces 43 or rails are complementary to one another in order to achieve as high a brake force as possible.

In this regard, by way of example actuators 30 are provided on the extension or extensions 41, said actuators bringing about a radial movement of the grinding shoe 39 in the direction 40 toward the brake surface 43 when actuated accordingly.

The magnetic rail brake arrangement 14 may comprise one or more grinding shoes 39, in the present case five grinding shoes 39, which can be controlled together or individually.

These partially rotating component parts of the magnetic rail brake arrangement 14 do not have to be additionally covered owing to their difficult-to-access Installation location. However, a cover may be expedient in order to keep the dirt particles away from the interior space of the rotor 15.

The rotor interior space can also be sealed off in a relatively simple manner by a cover 21.

In one embodiment, the stator 22 and the gearbox 6 has oil cooling. In this case, separate cooling circuits or alternatively a common cooling circuit are conceivable. The rotor 15 of the generator 7 is in this case cooled by means of air.

The laminated cores of stator 22 and/or rotor 15 can be stacked axially continuously here. However, laminated cores composed axially of a plurality of partial laminated cores which are spaced apart from one another can also be Implemented both in the stator 22 and/or in the rotor 15, in order to create additional radial cooling gaps.

The generator 7 provided in this case is a rotary dynamo-electric machine, preferably an asynchronous machine or synchronous machine. Numbers of pole pairs from two to thirty are conceivable here.

Transmission ratios between wind rotor shaft 4 and rotor 15 of the generator of 20 to 200 are sought, depending on the embodiment.

In order to obtain a compact drive train, that is to say generator-gearbox arrangement 26 of the wind turbine 1, the features of the invention that are described and shown above may also be combined in other arbitrary combinations. By way of example, gearbox 6 and generator 7 do not necessarily have to be linked or cooperate mechanically by way of the described functional component 9, as illustrated in FIG. 1.

Rather, it is alternatively also conceivable for the gearbox 6 and the generator 7 to be arranged in particular axially separate from one another. It is important that at least component parts of the magnetic rail brake arrangement 14 are, viewed axially, at least partially arranged within the rotor 15 and/or the stator 22.

The brake torques achieved are all the greater the greater the distance of the hollow cylinder 17, and thus of the brake surface 43, from the gearbox output shaft 34 is.

The basic idea—of arranging a brake arrangement, in particular a magnetic rail brake arrangement 14, axially within the generator 7—can in particular also be implemented in the case of directly driven inner-rotor generators of a wind turbine 1.

The invention claimed is:

1. A generator-gearbox arrangement for a wind turbine, the generator-gearbox arrangement comprising:
    a generator comprising a stator and a rotor interacting with one another;
    a functional component arranged on an end side of the generator and comprising an extension which points toward the rotor; and
    a magnetic rail brake arrangement comprising component parts fastened to the extension, said magnetic rail brake arrangement designed to apply a braking action which is based on an operating principle of electromagnetic attraction between the magnetic rail brake arrangement and at least one of the rotor and the functional component,
    wherein the magnetic rail brake arrangement comprises a positionally fixed grinding shoe, said rotor comprising a brake surface which is complementary to the grinding shoe.

2. The generator-gearbox arrangement of claim 1, wherein the brake surface is provided on a support structure of the rotor.

3. The generator-gearbox arrangement of claim 1, wherein the rotor comprises a rotor support structure and a laminated core, the generator-gearbox arrangement further comprising a hollow cylinder which bears the laminated core, and connecting elements designed to fix the hollow cylinder to a rotor hub in a rotationally fixed manner, said connecting elements designed in particular as spoke arrangements.

4. The generator-gearbox arrangement of claim 3, wherein the brake surface is fastened to or provided on an axial portion of the hollow cylinder.

5. The generator-gearbox arrangement of claim 1, wherein the rotor comprises a rotor support structure, said magnetic rail brake arrangement being provided on the extension of the functional component, such that the magnetic rail brake arrangement is located circumferentially in a region of a portion of the rotor support structure which portion points toward the functional component.

6. The generator-gearbox arrangement of claim 1, further comprising a gearbox, said functional component arranged on the end side of the generator such as to point toward the gearbox.

7. The generator-gearbox arrangement of claim 1, wherein the grinding shoe, viewed from the brake surface, has a convex configuration.

8. The generator-gearbox arrangement of claim 1, further comprising a gearbox, wherein the gearbox and the generator are arranged directly on the functional component to create a respective end-side termination of the generator and the gearbox.

9. The generator-gearbox arrangement of claim 1, wherein the functional component comprises, in a radially outer region, a generator flange extension and a gearbox flange extension, with the generator flange extension and the gearbox flange extension extending in axially different directions.

10. The generator-gearbox arrangement of claim 9, wherein the generator flange extension forms a portion of a housing of the generator and/or the gearbox flange extension forms a portion of a housing of the gearbox.

11. The generator-gearbox arrangement of claim 1, wherein the functional component comprises, in a radially inner region, a connection piece capable of forming a bearing seat.

12. The generator-gearbox arrangement of claim 11, further comprising a gearbox comprising an output shaft which is mounted in the connection piece, said output shaft being connected to the rotor of the generator in a torque-transmitting manner.

13. A wind turbine, comprising:
    a control structure; and
    a generator-gearbox arrangement as set forth in claim 1, wherein the magnetic rail brake arrangement comprises an actuator which is embedded in the control structure.

* * * * *